Figure 1:

G. Mooney,
Gas Socket.
No. 84,961. Patented Dec. 15, 1868.

GEORGE MOONEY, OF PROVIDENCE, RHODE ISLAND, ASSIGNOR TO MOONEY, ARNOLD, AND SHAW, OF SAME PLACE.

Letters Patent No. 84,961, dated December 15, 1868.

IMPROVEMENT IN GAS-SOCKETS.

The Schedule referred to in these Letters Patent and making part of the same.

*To whom it may concern:*

Be it known that I, GEORGE MOONEY, of the city and county of Providence, and State of Rhode Island, have invented a new and improved Gas-Socket, for use in connection with gas-fixtures; and I do hereby declare that the following description thereof is true and correct.

The use of gas-sockets, or socket-joints, as they are sometimes called, is essential with pendent or standard burners generally, they not being permanently attached to the fixture.

Vulcanized rubber has generally been used in sockets, for creating a gas-tight joint, although cork, leather, and cloth have sometimes been applied, with less satisfactory results.

Rubber has been used in three ways, in the manufacture of gas-sockets, viz:

By the insertion of soft prepared rubber within the barrel of the socket, and vulcanizing or baking it while on a former of the shape of the burners on which it is to be used.

Again, by having the shell of the socket composed of two distinct pieces, the lower screwing into the upper, with space for inserting a packing of rubber, of particular form, previously moulded expressly for the purpose, between the two pieces; and Thirdly, by drawing the shell of the socket in one piece, inserting a piece of rubber tubing of the requisite length, and securing the same within the socket, by turning in or over the lower edge of the shell.

This latter form or kind of socket was first made by me, and has been in public use for more than two years. From the fact that there was no metal extended below the rubber, to resist any lateral movement of the socket, it was liable to become loose upon the burner from which it was conducting gas.

I now obviate this liability, by so forming my socket that its base extends below the rubber, and, by contact with the burner, resists any lateral movement.

This constitutes an important feature of my invention, which, however, embraces, also, a novelty in form, resting in the thickness of the metal at the upper end of the socket, as compared with other parts of it. This form admits of the cutting of the necessary thread therein, as well as securing the requisite strength.

This leaving the metal at the top undrawn is effected by bringing no lateral pressure or strain upon that portion of the metal, in consequence of the form of the lower end of the male die, being smaller in diameter than that of the female die, less the thickness, doubled, of the metal being used. In its action, it is obvious that the metal at that point is thicker than at other points, where lateral as well as downward strain is effected by the relative sizes of the male and female die.

By reference to the accompanying drawings, a complete knowledge of the distinctive features of my invention will be obtained.

Figure 1 represents a socket-shell in process of construction, drawn from one piece of metal. It will be observed that the upper portion thereof is thicker than the lower, for the reason heretofore explained. The section or portion of the figure marked A is tapering, the lower end being larger than the upper.

Figure 2:
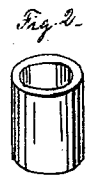

Figure 2 represents a piece of rubber tubing, such as is used for a great variety of other purposes, and may be termed the ordinary vulcanized elastic tubing. The piece shown is cut into proper length for insertion into the socket-shell at point A, as shown in fig. 1.

Figure 3:

Figure 3 represents a section of one of my sockets complete. At A will be seen the rubber tubing properly in position. At A A, it will be observed, the shell has been contracted after the insertion of the rubber, securely retaining it in its proper position, as well as by the continuation of the metal, to afford the requisite support before described.

Figure 4:
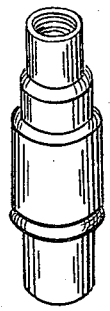

Figure 4 represents an elevation view of my socket when finished.

Having thus described my invention,

I claim as new, and for which I desire Letters Patent—

A gas-socket, constructed of one piece of metal, possessing the recess, fitted with a packing, consisting of a piece of the ordinary elastic-rubber tubing, and the extension of the metal below the packing, in the manner and for the purposes described.

GEORGE MOONEY.

Witnesses:
 ALBERT E. MAKER,
 BERNARD ZEAYAN.